US005914764A

United States Patent [19]

Henderson

[11] Patent Number: 5,914,764

[45] Date of Patent: Jun. 22, 1999

[54] METHOD AND APPARATUS FOR USING OPTICAL RESPONSE TIME TO CONTROL A LIQUID CRYSTAL DISPLAY

[75] Inventor: James P. Henderson, Cedar Rapids, Iowa

[73] Assignee: Rockwell International Corporation, Costa Mesa, Calif.

[21] Appl. No.: 08/719,662

[22] Filed: Sep. 25, 1996

[51] Int. Cl.[6] .......... G02F 1/133; G02F 1/135; G02F 1/1333

[52] U.S. Cl. .......... 349/161; 349/72; 349/25; 345/201; 345/207

[58] Field of Search .......... 349/72, 161; 345/201, 345/207

[56] References Cited

U.S. PATENT DOCUMENTS 4,119,842 10/1978 Hayden et al. .......... 349/72
4,128,311 12/1978 Smith et al. .......... 349/161
4,621,261 11/1986 Hehlen et al. .......... 345/101
4,888,599 12/1989 Harwood et al. .......... 340/812
4,919,520 4/1990 Okada et al. .......... 349/72
5,157,525 10/1992 Eaton et al. .......... 345/87
5,706,035 1/1998 Tsunoda et al. .......... 345/202
5,717,421 2/1998 Katakura et al. .......... 345/101

*Primary Examiner*—Hung X. Dang
*Assistant Examiner*—Toan Ton
*Attorney, Agent, or Firm*—Kyle Eppele; James P. O'Shaughnessy

[57] ABSTRACT

A system and technique for controlling LCDs based upon measurement of optical response is disclosed, which includes a light source and a light detector on opposite sides of an independently driven test area of a LCD panel. A determination of the optical response time is made by comparing the varying signals from the LCD drive and the response detector and then changing the operation of the LCD panel or heater based upon the comparison.

10 Claims, 2 Drawing Sheets

METHOD AND APPARATUS FOR USING OPTICAL RESPONSE TIME TO CONTROL A LIQUID CRYSTAL DISPLAY

FIELD OF THE INVENTION

The present invention generally relates to liquid crystal displays (LCDs) and more particularly to controlling LCDs, and even more particularly relates to use of optical response monitoring to control an LCD.

BACKGROUND

In recent years, avionics engineers have endeavored to enhance the performance of Liquid Crystal Displays. Of the many design and environmental parameters found to affect LCD performance, temperature ranks among those with the greatest impact. Current designs attempt to regulate and/or compensate for temperature fluctuation by monitoring the temperature of the display surface using temperature sensors and adjusting drive parameters and heater controls.

While this approach improves performance over designs which neglect temperature dependence, it has several shortcomings. For example, 1. The temperature reading is taken on the outside of the grass. Consequently, there may be a significant difference between that measured temperature and the temperature of the liquid crystal material.
2. The sensor temperature rise/fall lags or leads the temperature of the liquid crystal material due to proximity. This injects a risk of damaging the display by continuing to heat it beyond safe limits.
3. Corrections to the drive parameters are based on the actual response of the liquid-crystal material which does not vary linearly with temperature. Therefore, circuitry that attempts to use temperature readings to control the heater and drive parameters can be very complicated or wildly inaccurate.

Consequently, there exists a need for an improved method for monitoring the temperature-dependent characteristics of an LCD.

SUMMARY OF THE INVENTION

It is an object of the present invention to provide an LCD with improved control characteristics.

It is a feature of the present invention to include a monitor to measure optical response time.

It is an advantage of the present invention to provide enhanced control of an LCD by using a direct measurement of the optical response time.

The present invention is a method and an apparatus which are designed to satisfy the aforementioned needs, provide the previously stated objects, include the above listed features, and achieve the already articulated advantages. In the present invention, the control of an LCD is not based upon monitoring some exterior glass temperature. Instead a more direct approach of monitoring actual optical response time is used.

Accordingly, the present invention is a method and apparatus to control the operation of an LCD which uses actual measurements of optical response times to control LCD drive parameters and heater controls.

BRIEF DESCRIPTION OF THE DRAWINGS

The invention may be more fully understood by reading the following description of a preferred embodiment of the invention, in conjunction with the appended drawing wherein.

DETAILED DESCRIPTION

Figure 1:
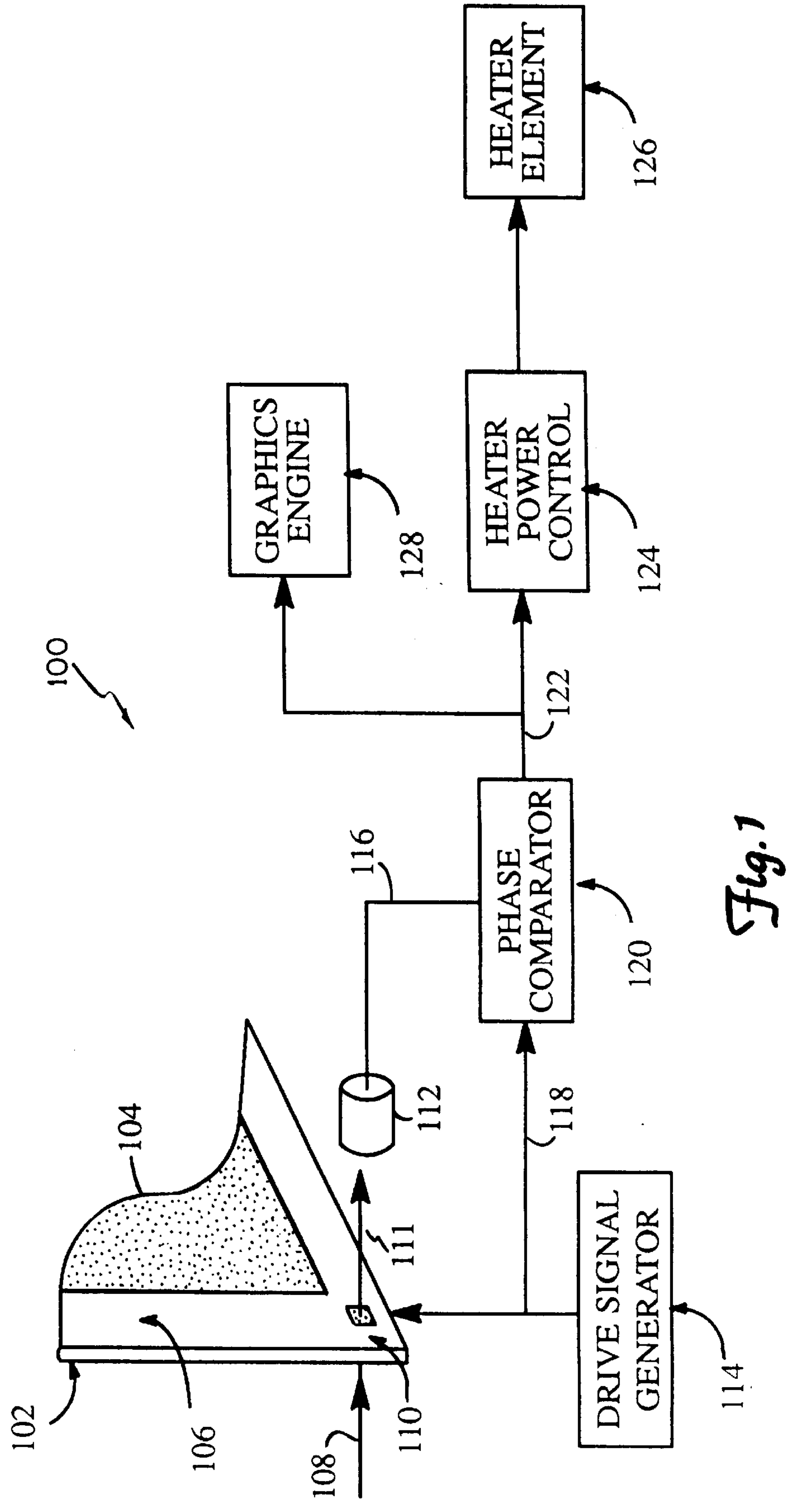
FIG. 1 is a block diagram view of the apparatus of the present invention in conjunction with a perspective view of a portion of a typical LCD.

Now referring to the drawings, where like numerals refer to like matter throughout, and more particularly to FIG. 1, there is shown a system of the present invention generally designated 100. LCD panel 102 is shown having a viewing area 104 and a periphery 106. Also shown is a test pixel 110, which is preferably located outside of the viewing area 104 and in the periphery 106 and which like other pixels in the viewing area subject to control of LCD drivers which are well known in the art. Light source 108 is shown incident upon test pixel 110. The intensity of incident light 108 is altered by test pixel 110 resulting in transmitted light 111. A photo detector 112 which converts the incident light into an electronic signal is shown with transmitted light 111 incident thereon. Test pixel 110 is controlled using known techniques and structure such as drive signal generator 114 but with a signal having a predetermined waveform or characteristics, such as a square or sine wave. Drive signal generator 114 may be a dedicated square or sine wave generator or it may be the drive electronics for the display which are operated in a predetermined fashion. The predetermined waveform is provided along line 118 to phase comparator 120 which also receives the output on line 116 from the detector 112. Comparator 120 generates a signal corresponding to the phase difference between the signals on lines 116 and 118. The phase difference is monitored and compared to an expected phase difference and a control signal is issued by the heater power control 124 for control of the heater element 126. As heat is applied to the panel 102 the phase difference signal on line 122 performs the function of providing feedback to the power control 124. The phase difference value is also routed to the graphics engine 128 which bases image update rates and image complexity on the measured value.

Figure 2:
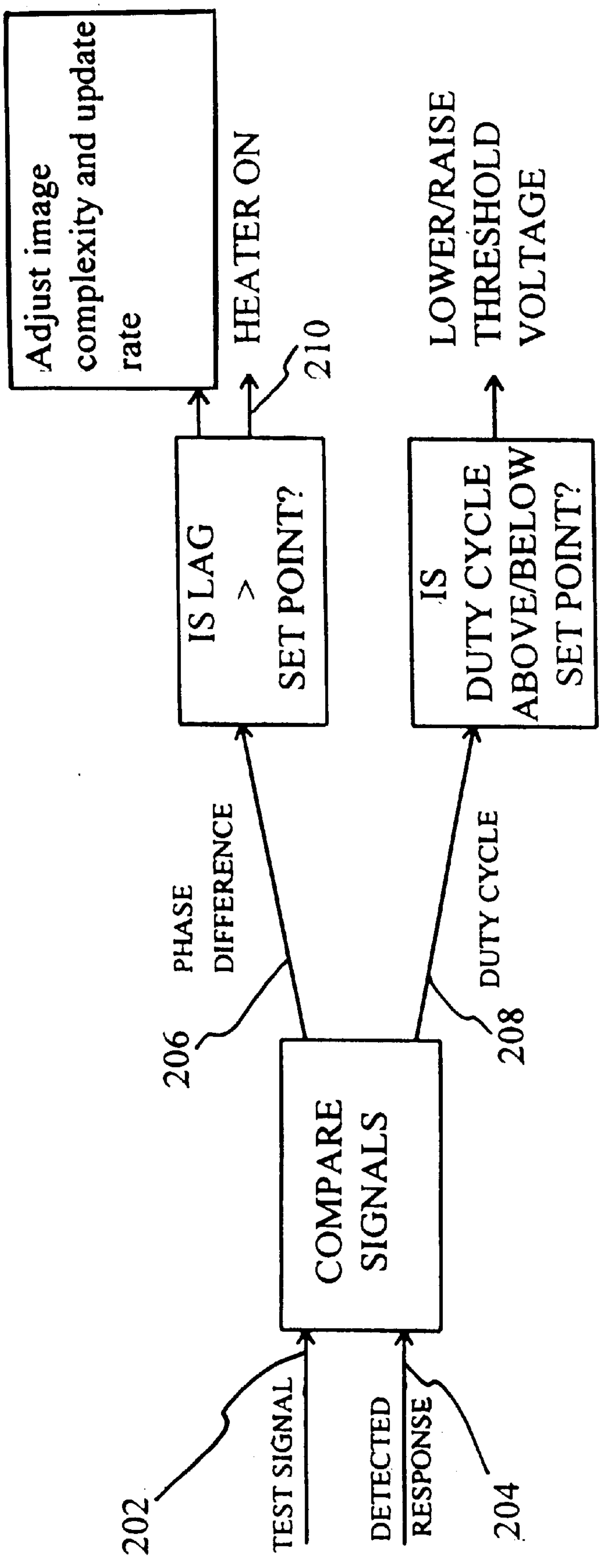
FIG. 2 is a flow chart of a particular technique of the present invention.

Now referring to FIG. 2, there is shown a flow chart generally designated 200 of the method of the present invention. The input into the process is a test signal 202 along with a detected response 204 which is measured after an optical signal traverses the liquid crystal material (not shown). The test signal 202 may be actual signals from drivers used to drive the display. Inputs 202 and 204 are compared and phase difference signals 206 and duty cycle 208 are generated. The phase difference signal 206 is compared to a predetermined level of phase shift and the heater signal is activated. Graphics engine 128 (FIG. 1) can be adjusted in response to the phase difference signal 206. Similarly, duty cycle is compared with a predetermined level and an adjustment of threshold voltage can be affected. The output of the process is a heater on/off control signal and a threshold voltage level control signal as well as a numeric value available to the graphics generation circuitry.

It is thought that the LCD heater system, of the present invention, will be understood from the foregoing description and it will be apparent that various changes may be made in the form, construction, steps and the arrangement of the parts and steps, without departing from the spirit and scope of the invention or sacrificing all of their material advantages, the form herein being merely preferred or exemplary embodiments thereof.

I claim:

1. A liquid crystal display comprising:

a liquid crystal panel, means for transmitting light having a predetermined characteristic through the panel, means for detecting light transmitted through the panel, phase comparator means for comparing the light detected with the light having a predetermined characteristic and generating a comparison signal, and, means responsive to the comparison signal for affecting variable control of the panel.

2. A display of claim 1 wherein said means for transmitting light having a predetermined characteristic comprising a backlight and means for driving the panel in a recognizable fashion.

3. A display of claim 1 wherein said means responsive to the comparison signal is a heater.

4. A display of claim 1 wherein said means responsive to the comparison signal is a graphics engine.

5. A display of claim 2 wherein said means responsive to the comparison signal is a heater.

6. A display of claim 2 wherein said means responsive to the comparison signal is a graphics engine.

7. A liquid crystal display comprising:

a liquid crystal display panel;

a backlight, optically coupled with the panel, for illuminating the panel;

a detector, optically coupled with the panel, for detecting light transmitted through the panels, and for generating a detector signal;

means for driving the panel in a predetermined manner and for generating a driver signal;

means for comparing the detector signal and the driver signal and generating a comparison signal; and, a graphics engine means coupled to the means for driving, said graphics engine means being responsive to the comparison signal.

8. A method of controlling a liquid crystal display comprising the steps of:

illuminating a liquid crystal panel and generating a drive signal which is representative of a predetermined characteristic provided by driving the panel;

driving a portion of the liquid crystal panel in a predetermined manner which affects the light transmission characteristics through the panel;

performing a phase comparison of light exiting the panel with the drive signal;

generating a phase difference signal in response to the comparison; and, adjusting display controls in response to the phase difference.

9. A method of claim 8 wherein said step of adjusting display controls comprises adjusting heater power controls.

10. A method of claim 8 wherein said step of adjusting display controls comprises adjusting the output of a graphics engine.

* * * * *